US012088979B2

United States Patent
Gilson et al.

(10) Patent No.: US 12,088,979 B2
(45) Date of Patent: Sep. 10, 2024

(54) RADIO FREQUENCY SYSTEM SENSOR INTERFACE

(71) Applicant: RTX Corporation, Farmington, CT (US)

(72) Inventors: Jonathan Gilson, West Hartford, CT (US); Joseph V. Mantese, Ellington, CT (US); Goran Djuknic, New York, NY (US); Gurkan Gok, Milford, CT (US); Brenda J. Lisitano, Middletown, CT (US); Coy Bruce Wood, Ellington, CT (US); Sanjay Bajekal, Bothell, WA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/592,149

(22) Filed: Feb. 3, 2022

(65) Prior Publication Data

US 2022/0159356 A1    May 19, 2022

Related U.S. Application Data

(63) Continuation of application No. 16/692,128, filed on Nov. 22, 2019, now Pat. No. 11,277,676.

(51) Int. Cl.
*H04Q 9/00* (2006.01)

(52) U.S. Cl.
CPC ........... *H04Q 9/00* (2013.01); *H04Q 2209/10* (2013.01); *H04Q 2209/40* (2013.01);
(Continued)

(58) Field of Classification Search
CPC .. H04Q 9/00; H04Q 2209/00; H04Q 2209/10; H04Q 2209/40; H04Q 2209/47;
(Continued)

(56) References Cited

U.S. PATENT DOCUMENTS

| 5,267,436 A | 12/1993 | Wood, Jr. et al. |
| 6,287,253 B1 * | 9/2001 | Ortega ................ A61B 5/002 600/300 |

(Continued)

FOREIGN PATENT DOCUMENTS

| CN | 1364002 A  * | 8/2002 | ............. H04B 11/00 |
| EP | 3291570 A1 | 3/2018 | |
| WO | 02065380 A2 | 8/2022 | |

OTHER PUBLICATIONS

EP Application No. 20205026.6 Extended EP Search Report dated Mar. 24, 2021, 9 pages.
(Continued)

*Primary Examiner* — Franklin D Balseca
(74) *Attorney, Agent, or Firm* — CANTOR COLBURN LLP (57) ABSTRACT

A system of a machine includes a network of nodes distributed throughout the machine. Each of the nodes is operable to communicate through electromagnetic signals. The system also includes a radio frequency transceiver, a first antenna coupled to the radio frequency transceiver, a second antenna coupled to one or more sensor nodes, and a controller coupled to the radio frequency transceiver. The controller is configured to select at least one sensor node to interrogate, transmit one or more interrogation frequencies from the radio frequency transceiver through the first antenna to the second antenna, receive one or more sensor frequencies at the first antenna broadcast from the second antenna based on a frequency response of the at least one sensor node to the one or more interrogation frequencies, and determine one or more sensed values based on the sensor frequencies received at the radio frequency transceiver through the first antenna.

17 Claims, 5 Drawing Sheets

(52) U.S. Cl.
CPC ..... *H04Q 2209/75* (2013.01); *H04Q 2209/84* (2013.01); *H04Q 2209/86* (2013.01)

(58) Field of Classification Search
CPC ........... H04Q 2209/70; H04Q 2209/75; H04Q 2209/80; H04Q 2209/84; H04Q 2209/86
See application file for complete search history.

(56) References Cited

U.S. PATENT DOCUMENTS

| | | | |
|---|---|---|---|
| 7,455,495 B2 | 11/2008 | Leogrande et al. | |
| 7,464,585 B2 | 12/2008 | Schwarz et al. | |
| 7,570,169 B2 * | 8/2009 | Li | H01Q 9/065 |
| | | | 343/745 |
| 7,769,507 B2 | 8/2010 | Volponi et al. | |
| 7,844,385 B2 | 11/2010 | Loda et al. | |
| 7,927,067 B2 | 4/2011 | Rajamani et al. | |
| 8,026,857 B2 | 9/2011 | Bommer | |
| 8,074,498 B2 | 12/2011 | Agrawal et al. | |
| 8,085,108 B2 | 12/2011 | Philippe | |
| 8,204,671 B2 | 6/2012 | Agrawal et al. | |
| 8,256,277 B2 | 9/2012 | Khilbnik et al. | |
| 8,344,912 B2 | 1/2013 | Mitchell | |
| 8,424,279 B2 | 4/2013 | Rajamani et al. | |
| 8,459,103 B2 | 6/2013 | Khilbnik et al. | |
| 8,570,152 B2 | 10/2013 | Fahley et al. | |
| 8,733,149 B2 | 5/2014 | Yu et al. | |
| 8,754,320 B2 | 6/2014 | Mantese | |
| 8,800,261 B2 | 8/2014 | Hall et al. | |
| 8,820,088 B2 | 9/2014 | Gilson et al. | |
| 8,973,364 B2 | 3/2015 | Gilson et al. | |
| 8,997,497 B2 | 4/2015 | Hall et al. | |
| 9,051,897 B2 | 6/2015 | Schwarz et al. | |
| 9,387,333 B2 * | 7/2016 | Dimas | G06Q 10/00 |
| 9,599,637 B2 | 3/2017 | Mantese et al. | |
| 9,745,918 B2 | 8/2017 | Gilson et al. | |
| 9,920,653 B2 | 3/2018 | Lord et al. | |
| 9,932,933 B2 | 4/2018 | Lord et al. | |
| 9,986,310 B2 | 5/2018 | Sobanski et al. | |
| 9,990,576 B2 | 6/2018 | Nardi et al. | |
| 10,051,345 B2 | 8/2018 | Mantese et al. | |
| 10,057,663 B2 | 8/2018 | Sobanski et al. | |
| 10,066,548 B2 | 9/2018 | Gilson et al. | |
| 10,080,068 B2 | 9/2018 | Sobanski | |
| 10,091,562 B2 | 10/2018 | Mantese et al. | |
| 10,107,132 B2 | 10/2018 | Wu et al. | |
| 10,107,191 B2 | 10/2018 | Gilson et al. | |
| 10,140,566 B2 * | 11/2018 | Viikari | G06K 19/0723 |
| 10,145,729 B2 * | 12/2018 | Viikari | G01H 13/00 |
| 10,184,340 B2 | 1/2019 | Baltas et al. | |
| 10,253,417 B2 | 4/2019 | Viens et al. | |
| 10,253,984 B2 | 4/2019 | Pearson et al. | |
| 10,301,971 B2 | 5/2019 | Lord et al. | |
| 10,337,121 B2 | 7/2019 | Mantese et al. | |
| 10,362,115 B2 | 7/2019 | Bommer et al. | |
| 10,371,051 B2 | 8/2019 | Gilson et al. | |
| 10,405,066 B2 | 9/2019 | Sobanski et al. | |
| 10,410,814 B2 | 9/2019 | Mantese et al. | |
| 10,419,831 B2 | 9/2019 | Mantese et al. | |
| 10,461,973 B2 | 10/2019 | Nikunen et al. | |
| 10,469,920 B2 | 11/2019 | Zacchio et al. | |
| 10,484,760 B2 | 11/2019 | Mantese et al. | |
| 10,491,970 B2 | 11/2019 | Sobanski et al. | |
| 10,531,166 B2 | 1/2020 | Mantese et al. | |
| 10,539,524 B2 * | 1/2020 | Potyrailo | G01N 33/2847 |
| 10,581,279 B2 * | 3/2020 | Mantese | H01L 35/28 |
| 10,589,351 B2 | 3/2020 | Rebbecchi et al. | |
| 10,638,207 B2 | 4/2020 | Mantese et al. | |
| 10,655,538 B2 | 5/2020 | Gilson et al. | |
| 10,711,367 B2 | 7/2020 | Mantese et al. | |
| 10,826,547 B1 | 11/2020 | Gilson et al. | |
| 10,998,958 B1 | 5/2021 | Gilson | |
| 11,277,676 B2 * | 3/2022 | Gilson | H04B 1/38 |
| 11,289,639 B2 | 3/2022 | Gilbert et al. | |
| 11,290,084 B2 * | 3/2022 | Nielsen | H03H 9/545 |
| 2005/0040934 A1 | 2/2005 | Shanton | |
| 2007/0119257 A1 | 5/2007 | Hayasaka et al. | |
| 2008/0153415 A1 | 6/2008 | Block et al. | |
| 2009/0184877 A1 | 7/2009 | Bommer | |
| 2010/0129202 A1 | 5/2010 | Garner | |
| 2010/0287907 A1 | 11/2010 | Agrawal et al. | |
| 2010/0321191 A1 | 12/2010 | Gong et al. | |
| 2012/0176138 A1 | 7/2012 | Prammer | |
| 2012/0256492 A1 | 10/2012 | Song et al. | |
| 2013/0219922 A1 | 8/2013 | Gilson et al. | |
| 2013/0283821 A1 | 10/2013 | Gilson et al. | |
| 2014/0015642 A1 | 1/2014 | White | |
| 2014/0113671 A1 | 4/2014 | Schwengler | |
| 2014/0144153 A1 | 5/2014 | Healy | |
| 2014/0366554 A1 | 12/2014 | Gilson et al. | |
| 2016/0040604 A1 | 2/2016 | Hrach et al. | |
| 2016/0108854 A1 | 4/2016 | Lord et al. | |
| 2016/0169939 A1 | 6/2016 | Tokgoz et al. | |
| 2016/0313139 A1 | 10/2016 | Klecka et al. | |
| 2016/0319837 A1 | 11/2016 | Morris et al. | |
| 2016/0356866 A1 | 12/2016 | Attridge et al. | |
| 2016/0370256 A1 | 12/2016 | Zacchio et al. | |
| 2017/0084987 A1 | 3/2017 | Reith et al. | |
| 2017/0238070 A1 | 8/2017 | Mantese et al. | |
| 2017/0286820 A1 | 10/2017 | Nikunen et al. | |
| 2017/0366228 A1 | 12/2017 | Bobrek et al. | |
| 2018/0209379 A1 | 7/2018 | Lord et al. | |
| 2018/0238574 A1 | 8/2018 | Ky et al. | |
| 2018/0262820 A1 | 9/2018 | Mantese et al. | |
| 2018/0289359 A1 | 10/2018 | Heims et al. | |
| 2018/0294838 A1 | 10/2018 | Snyder et al. | |
| 2018/0360312 A1 | 12/2018 | Gupta et al. | |
| 2018/0372563 A1 | 12/2018 | Rogers et al. | |
| 2019/0127877 A1 | 5/2019 | Mantese et al. | |
| 2019/0345835 A1 | 11/2019 | Terwilliger et al. | |
| 2020/0025036 A1 | 1/2020 | Lord et al. | |
| 2020/0060077 A1 | 2/2020 | Bejcek | |
| 2021/0053548 A1 | 2/2021 | Michel | |
| 2021/0159930 A1 | 5/2021 | Gilson et al. | |

OTHER PUBLICATIONS

EP Application No. 20205028.2 Extended EP Search Report dated Mar. 25, 2021, 8 pages.
EP Application No. 202050316 Extended EP Search Report dated Mar. 24, 2021, 9 pages.
Hotte, et al., "A Concept of Pressure Sensor Based on Slotted Waveguide Antenna Array for Passive MMID Sensor Networks", IEEE Sensors Journal, vol. 16, No. 14, Jul. 15, 2016, 5 pages.
Wenqiang, et al., "A novel physical parameters measuring method using wireless passive sensor in harsh environment", 2015 IEEE 12th International Conference on Electronic Measurement & Instruments, vol. 3, Jul. 16, 2015, pp. 1481-1485.

* cited by examiner

RADIO FREQUENCY SYSTEM SENSOR INTERFACE

CROSS-REFERENCE TO RELATED APPLICATIONS

This application is a continuation of U.S. application Ser. No. 16/692,128, filed Nov. 22, 2019, the disclosure of which is incorporated herein by reference in its entirety.

BACKGROUND

This disclosure relates to electromagnetic communication, and more particularly to a sensor interface for a radio frequency system.

As control and health monitoring systems become more complex, the interconnect count between system components increases, which also increases failure probabilities. With the increase in interconnects, troubleshooting systems may not always identify the contributing faulty components reliably when system anomalies occur. Failures associated with such systems are often due to connection system failures, including: sensors, wiring, and connectors that provide interconnection (e.g., signal and power) between all components.

Difficulties can arise when troubleshooting these complex interconnected systems, especially when the systems include subsystems having electronic components connected to control system devices, such as actuators, valves or sensors. For example, a noisy signal in a sensor reading could be caused by a faulty interface circuit in the electronic component, a faulty wire or short(s) in the cable system, and/or a faulty or intermittent sensor. The time associated with identifying a faulty component quickly and accurately affects operational reliability.

Detailed knowledge of machinery operation for control or health monitoring requires sensing systems that need information from locations that are sometimes difficult to access due to moving parts, internal operating environment or machine configuration. The access limitations make wire routing bulky, expensive and vulnerable to interconnect failures. The sensor and interconnect operating environments for desired sensor locations often exceed the capability of the interconnect systems. In some cases, cable cost, volume and weight exceed the desired limits for practical applications.

Application of electromagnetic sensor and effector technologies to address the wiring constraints faces the challenge of providing reliable communications in a potentially unknown environment with potential interference from internal or external sources. Large-scale deployments of multiple sensors and/or effectors with varying signal path lengths further increases the challenges of normal operation and fault detection in a network of connected nodes. High temperature environments further constrain communication and sensor/effector system components.

BRIEF DESCRIPTION

According to one embodiment, a system of a machine includes a network of a plurality of nodes distributed throughout the machine. Each of the nodes is operable to communicate through a plurality of electromagnetic signals. The system also includes a radio frequency transceiver, a first antenna coupled to the radio frequency transceiver, a second antenna coupled to one or more sensor nodes of the plurality of nodes, and a controller coupled to the radio frequency transceiver. The controller is configured to select at least one sensor node to interrogate, transmit one or more interrogation frequencies from the radio frequency transceiver through the first antenna to the second antenna, receive one or more sensor frequencies at the first antenna broadcast from the second antenna based on a frequency response of the at least one sensor node to the one or more interrogation frequencies, and determine one or more sensed values based on the one or more sensor frequencies received at the radio frequency transceiver through the first antenna. The plurality of nodes can include a first sensor node including one or more sensors and a second sensor node including one or more sensors, and where each of the one or more sensors of the first sensor node and each of the one or more sensors of the second senor node are identified by a frequency closeness to a designated reference frequency.

In addition to one or more of the features described above or below, or as an alternative, further embodiments may include a waveguide coupled to the first antenna and the second antenna, where the waveguide is configured to guide electromagnetic signals transmitted between the first antenna and the second antenna.

In addition to one or more of the features described above or below, or as an alternative, further embodiments may include where the first antenna and the second antenna are within an electromagnetically closed space.

In addition to one or more of the features described above or below, or as an alternative, further embodiments may include where the one or more sensor nodes each include a resonator having a different resonant frequency and configured to respond to one of the one or more interrogation frequencies.

In addition to one or more of the features described above or below, or as an alternative, further embodiments may include where a sensor of the one or more sensors of the first sensor node includes a capacitive sensor coupled to a first resonator and configured to shift a first resonant frequency of the first resonator based on a sensed capacitance of the capacitive sensor.

In addition to one or more of the features described above or below, or as an alternative, further embodiments may include where a sensor of the one or more sensors of the first sensor node comprises a voltage sensor coupled to a first resonator and configured to shift a first resonant frequency of the first resonator based on a sensed voltage of the voltage sensor.

In addition to one or more of the features described above or below, or as an alternative, further embodiments may include where a sensor of the one or more sensors of the first sensor node comprises a resistive sensor coupled to a first resonator and configured to change a magnitude of the first resonant frequency of the first resonator based on a sensed resistance of the resistive sensor.

According to an embodiment, a system for a gas turbine engine includes a network of a plurality of nodes distributed throughout the gas turbine engine. Each of the nodes is associated with at least one sensor and/or effector of the gas turbine engine and is operable to communicate through a plurality of electromagnetic signals. The system includes a radio frequency transceiver, a first antenna coupled to the radio frequency transceiver, a second antenna coupled to one or more sensor nodes of the plurality of nodes, and a controller coupled to the radio frequency transceiver. The controller is configured to select at least one sensor node to interrogate, transmit one or more interrogation frequencies from the radio frequency transceiver through the first antenna to the second antenna, receive one or more sensor frequencies at the first antenna broadcast from the second antenna based on a frequency response of the at least one sensor node to the one or more interrogation frequencies, and determine one or more sensed values based on the one or more sensor frequencies received at the radio frequency transceiver through the first antenna. The plurality of nodes can include a first sensor node including one or more sensors and a second sensor node including one or more sensors, and where each of the one or more sensors of the first sensor node and each of the one or more sensors of the second senor node are identified by a frequency closeness to a designated reference frequency.

In addition to one or more of the features described above or below, or as an alternative, further embodiments may include where one or more of the nodes are located at least one of a fan section, a compressor section, a combustor section and a turbine section of the gas turbine engine.

According to an embodiment, a method of establishing electromagnetic communication through a machine includes configuring a network of a plurality of nodes to communicate through a plurality of electromagnetic signals, where the nodes are distributed throughout the machine. A controller coupled to a radio frequency transceiver and a first antenna selects at least one sensor node of the nodes to interrogate. One or more interrogation frequencies are transmitted from the radio frequency transceiver through the first antenna to a second antenna coupled to the at least one sensor node. One or more sensor frequencies are received at the first antenna broadcast from the second antenna based on a frequency response of the at least one sensor node to the one or more interrogation frequencies. The controller determines one or more sensed values based on the one or more sensor frequencies received at the radio frequency transceiver through the first antenna. The plurality of nodes can include a first sensor node including one or more sensors and a second sensor node including one or more sensors, and where each of the one or more sensors of the first sensor node and each of the one or more sensors of the second senor node are identified by a frequency closeness to a designated reference frequency.

In addition to one or more of the features described above or below, or as an alternative, further embodiments may include guiding electromagnetic signals transmitted between the first antenna and the second antenna in a waveguide.

In addition to one or more of the features described above or below, or as an alternative, further embodiments may include confining electromagnetic signals transmitted between the first antenna and the second antenna within an electromagnetically closed space.

In addition to one or more of the features described above or below, or as an alternative, further embodiments may include where a sensor of the one or more sensors of the first sensor node comprises a capacitive sensor coupled to a first resonator, and the method includes shifting a first resonant frequency of the first resonator based on a sensed capacitance of the capacitive sensor.

In addition to one or more of the features described above or below, or as an alternative, further embodiments may include where a sensor of the one or more sensors of the first sensor node comprises a voltage sensor coupled to a first resonator, and the method includes shifting a first resonant frequency of the first resonator based on a sensed voltage of the voltage sensor.

In addition to one or more of the features described above or below, or as an alternative, further embodiments may include where a sensor of the one or more sensors of the first sensor node comprises a resistive sensor coupled to a first resonator, and the method includes changing a magnitude of a first resonant frequency of the first resonator based on a sensed resistance of the resistive sensor.

A technical effect of the apparatus, systems and methods is achieved by sensor interfaces for radio frequency systems as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
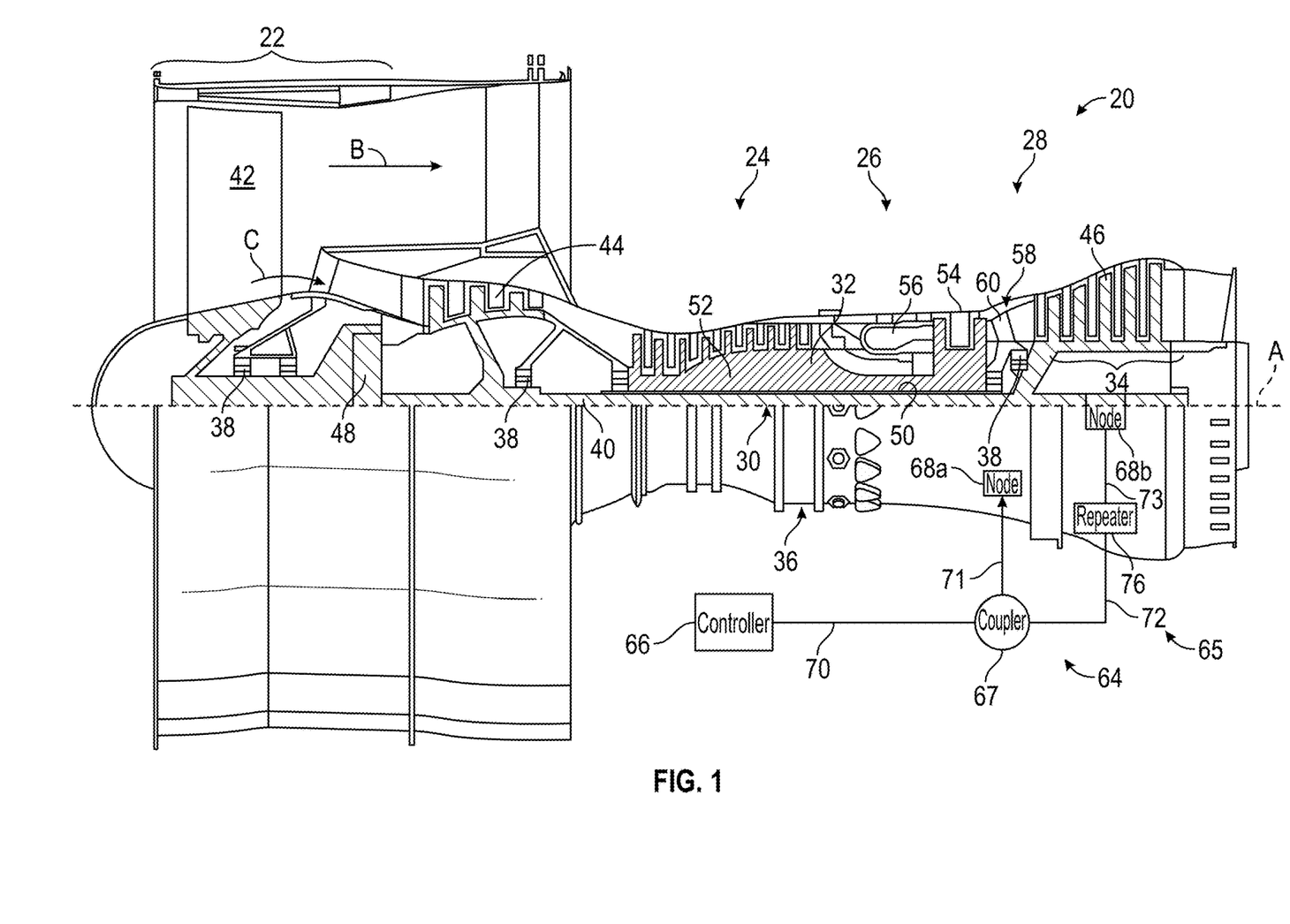
FIG. 1 is a cross-sectional view of a gas turbine engine as an example of a machine.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. Alternative engines may include an augmentor section (not shown) among other systems or features. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an effector node that can drive one or more effectors/actuators of the gas turbine engine 20. Node 68b is an example of a sensor node that can interface with one or more sensors of the gas turbine engine 20. Nodes 68a, 68b can include processing support circuitry to transmit/receive electromagnetic signals between sensors or effectors and the controller 66. A coupler 67 can be configured as a splitter between a waveguide 70 coupled to the controller 66 and waveguides 71 and 72 configured to establish guided electromagnetic transmission communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the electromagnetic signals between the controller 66 and one or more of the nodes 68a, 68b. The transmission media within waveguides 70-73 may include dielectric or gaseous material. In embodiments, the waveguides 70-73 can be hollow metal tubes. The disclosed system 64 may be utilized to control and/or monitor any component function or characteristic of a turbomachine, aircraft component operation, and/or other machines.

Prior control & diagnostic system architectures utilized in various applications include centralized system architecture in which the processing functions reside in an electronic control module. Redundancy to accommodate failures and continue system operation systems can be provided with dual channels with functionality replicated in both control channels. Actuator and sensor communication is accomplished through analog wiring for power, command, position feedback, sensor excitation and sensor signals. Cables and connections include shielding to minimize effects caused by electromagnetic interference (EMI). The use of analog wiring and the required connections limits application and capability of such systems due to the ability to locate wires, connectors and electronics in small and harsh environments that experience extremes in temperature, pressure, and/or vibration. Exemplary embodiments can use radio frequencies confined to waveguides 70-73 in a guided electromagnetic transmission architecture to provide both electromagnetic signals and power to the individual elements of the network 65.

The use of electromagnetic radiation in the form of radio waves (MHz to GHz) to communicate and power the sensors and effectors using a traditionally complex wired system enables substantial architectural simplification, especially as it pertains to size, weight, and power (SWaP). Embodiments of the invention enable extension of a network where reduced SNR would compromise network performance by trading off data rates for an expansion of the number of nodes and distribution lines; thereby enabling more nodes/sensors, with greater interconnectivity.

Figure 2:
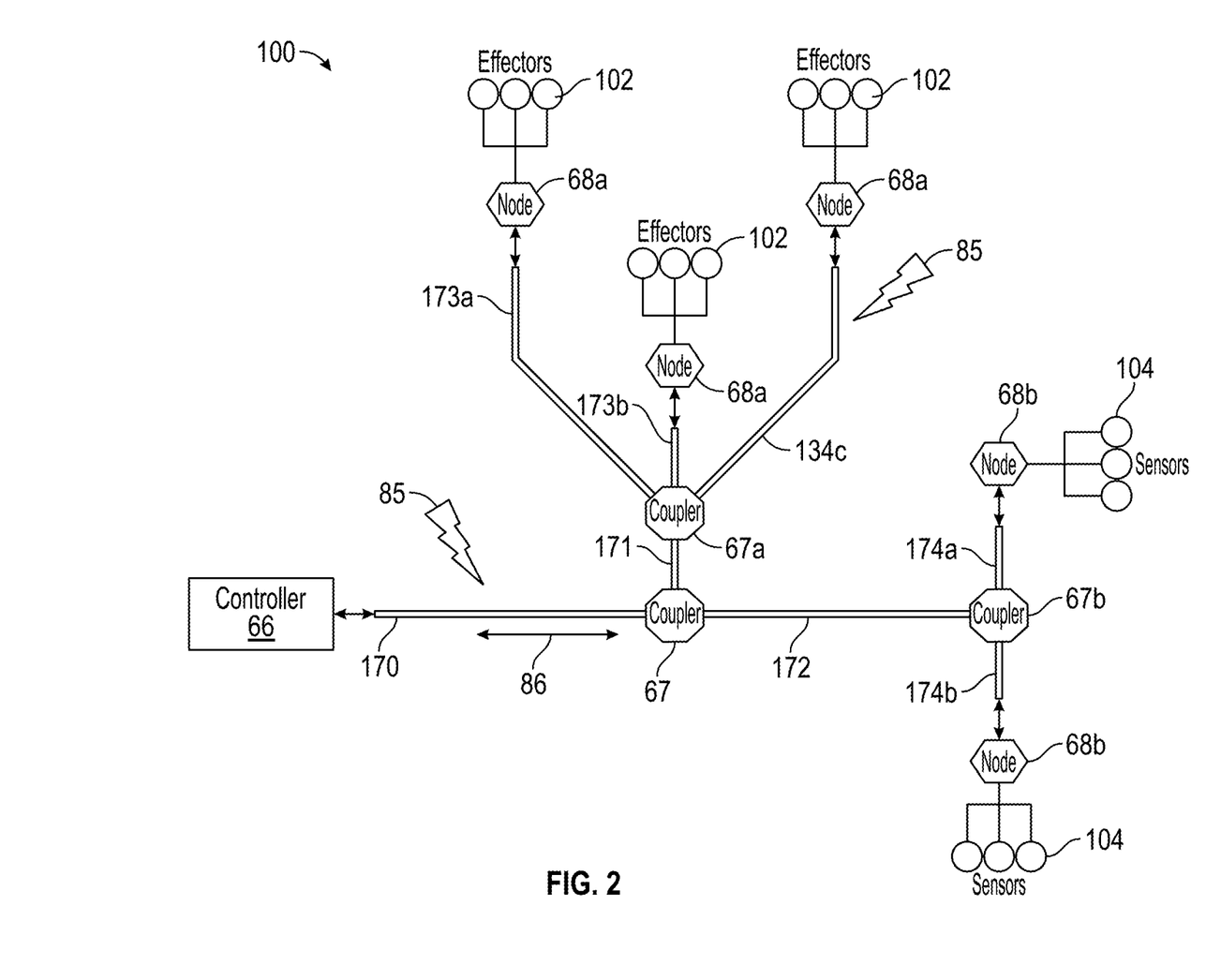
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Couper 67a is further coupled to three nodes 68a through waveguides 173a, 173b, 173c in parallel. Each of the nodes 68a can interface or be combined with multiple effectors 102. Coupler 67b is also coupled to two nodes 68b through waveguides 174a, 174b in parallel. Each of the nodes 68b can interface or be combined with multiple sensors 104. Although the example of FIG. 2 depicts connections to effectors 102 and sensors 104 isolated to different branches, it will be understood that effectors 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification (RFID) devices along with processing, memory and/or the interfaces to connect to conventional sensors or effectors, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and enable unauthorized access to information. In some embodiments, confined electromagnetic radiation is in the range 1-100 GHz. Electromagnetic radiation can be more tightly confined around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with effectors 102 may include control devices, such as a solenoid, switch or other physical actuation devices. RFID, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The shielding in the guided electromagnetic transmission network 100 can be provided such that power and communication signals are shielded from outside interference, which may be caused by environmental electromagnetic or optic interference. Moreover, the shielding prevents intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, pure environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for each monitored or controlled components to enable the use of a guided electromagnetic transmission network. For example, the system 64 can be incorporated in a variety of harsh environment machines, such as an elevator system, heating, ventilation, and air conditioning (HVAC) systems, manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that enables consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy without significantly increasing cost. Moreover, additional sensors can be added without the need for additional wiring and connections that provide for increased system accuracy and response. Finally, the embodiments enable a "plug-n-play" approach to add a new node, potentially without a requalification of the entire system but only the new component; thereby greatly reducing qualification costs and time.

Figure 3:
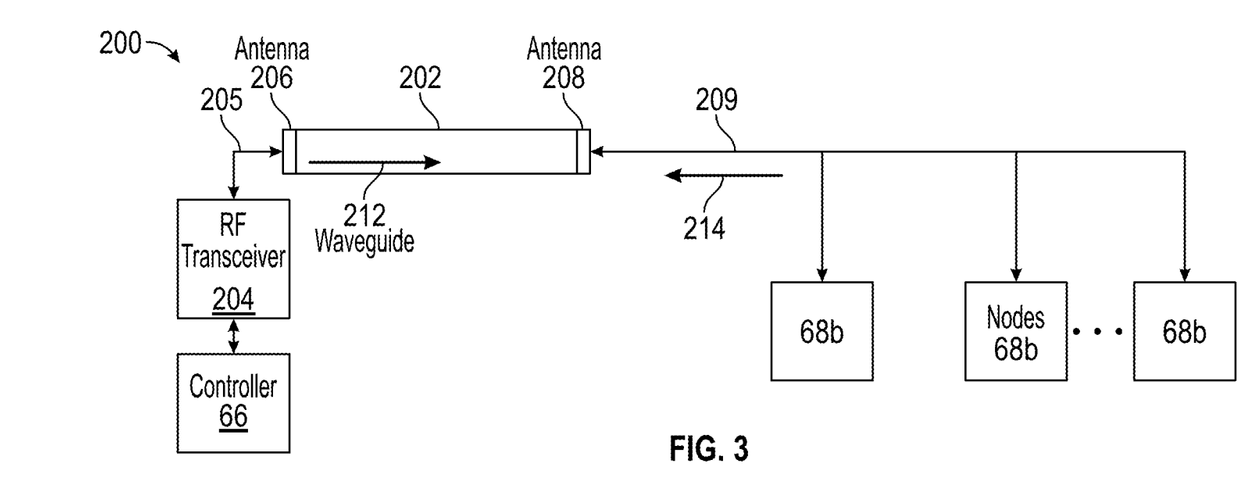
FIG. 3 is a schematic view of a communication path through a waveguide to a plurality of sensor nodes in accordance with an embodiment of the disclosure.

FIG. 3 is a schematic view of a communication path 200 through a waveguide 202 from controller 66 to a plurality of sensor nodes 68b. The communication path 200 can be part of network 65, 100 of FIGS. 1-2, or another guided electromagnetic transmission network. The waveguide 202 can be one or a plurality of waveguides configured to guide transmission of the electromagnetic signals. The communication path 200 also includes a radio frequency transceiver 204, a first antenna 206, and a second antenna 208. The first antenna 206 can be coupled to a first end of the waveguide 202, and the radio frequency transceiver 204 can be coupled between the controller 66 and the first antenna 206. The second antenna 208 can be coupled to a second end of the waveguide 202 and to one or more sensor nodes 68b. The first antenna 206 and the second antenna 208 enable guided electromagnetic transmission communication through the waveguide 202. The radio frequency transceiver 204 can be coupled to the first antenna 206 and the controller 66 through wired connections 205. Similarly, the second antenna 208 can be coupled to the sensor nodes 68b by wired connections 209.

The controller 66 can select one or more of the sensor nodes 68b for interrogation and command the radio frequency transceiver 204 to transmit one or more interrogation frequencies 212 associated with the selected sensor nodes 68b. In exemplary embodiments, the radio frequency transceiver 204 can be configured to transmit and receive microwave energy. The radio frequency transceiver 204 can provide a digital interface and/or a non-modulated analog interface to the controller 66. The interrogation frequencies 212 can be pure tones that provoke a resonance response in an associated sensor node 68b which returns one or more sensor frequencies 214 indicative of one or more sensed values. A sensor of the sensor nodes 68b can be identified by the frequency closeness of a tone to a designated resonant frequency. In this way, multiple sensors can be simultaneously read. Although FIG. 3 depicts a shared antenna 208 for the sensor nodes 68b, each of the sensor nodes 68b may have a separate antenna.

Figure 4:
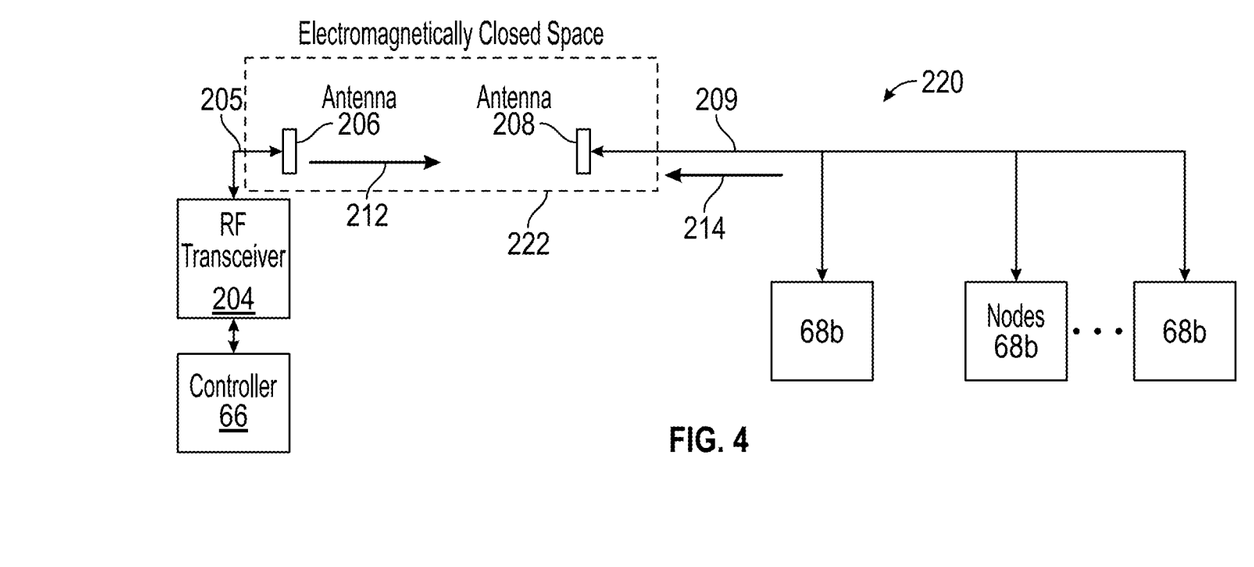
FIG. 4 is a schematic view of a communication path through free space or an electromagnetically closed space to a plurality of sensor nodes in accordance with an embodiment of the disclosure.

FIG. 4 is a schematic view of a communication path 220 through free space or an electromagnetically closed space 222 to a plurality of sensor nodes 68b. The communication path 220 can be part of network 65, 100 of FIGS. 1-2, or another guided electromagnetic transmission network. The electromagnetically closed space 222 can be a metallic chamber or other such enclosure not specifically designed as a waveguide. The electromagnetically closed space 222 can be omitted, for example, in low noise and/or low security risk environments. Other components of the communication path 220 can operate and be configured as previously described with respect to FIG. 3. In the electromagnetic transmission through a waveguide there is typically a tight correlation between electromagnetic frequency and dimensions of the waveguide (height and width), meaning that there will be electromagnetic propagation via different transverse electric and transverse-magnetic modes for a specific band of frequencies. Outside that band there will be no (electromagnetic) propagation. Namely, a waveguide can be constructed and dimensioned to facilitate these specific modes and frequency bands for propagation. The electromagnetic wave is launched in a specific manner (e.g., using an antenna inside the waveguide) to make this propagation possible. When antennas are positioned in an electromagnetically confined space (e.g., a closed metal container or metallic pipe) and radiate electromagnetic energy, there can be free-space-like electromagnetic propagation, where electromagnetic waves bounce from the walls of the enclosure. The enclosure can be considered confined because electromagnetic waves cannot penetrate the walls. In this case, any frequency may be propagated since there is no relationship between the radiated frequency and the enclosure dimensions. The shape and position of antennas within an enclosure can be arbitrary and does not depend on the dimensions of the enclosure.

Components of the sensor nodes 68b can be made of high-temperature capable materials using, for example passive elements and/or semiconductor diodes to survive high temperatures, such as an engine core. Materials for high-temperature application can include silicon carbide, gallium nitride, aluminum nitride, aluminum scrandium nitride, and other such materials. Further example variations of the sensor nodes 68b are provided in FIGS. 5, 6, and 7.

Figure 5:
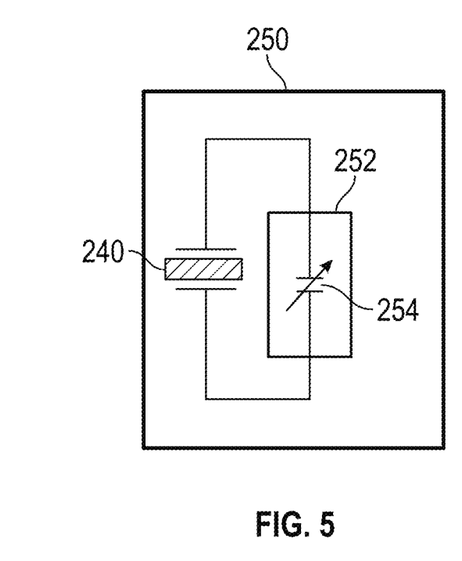
FIG. 5 is a schematic view of a capacitive sensor node in accordance with an embodiment of the disclosure.
Figure 6:
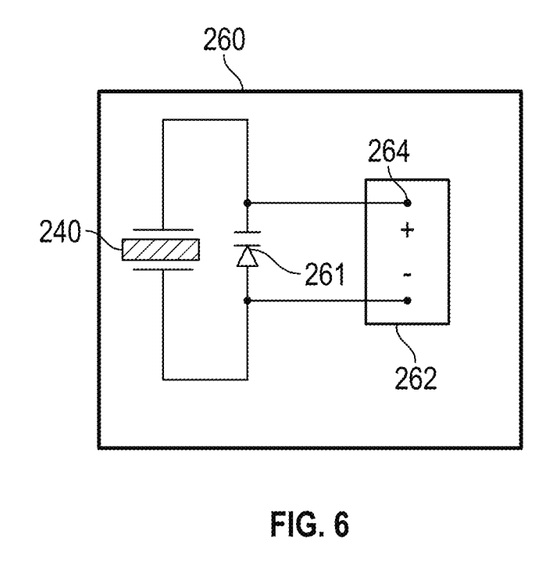
FIG. 6 is a schematic view of a voltage sensor node in accordance with an embodiment of the disclosure.
Figure 7:
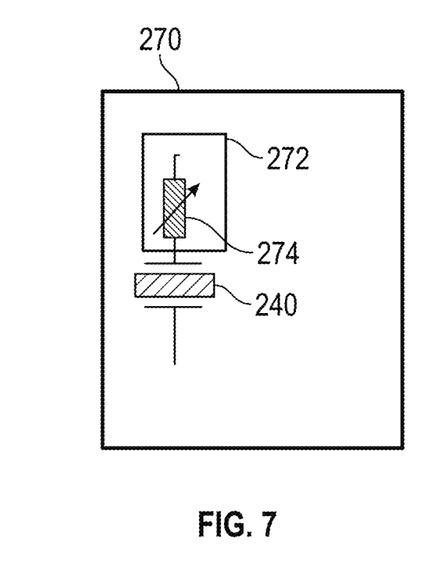
FIG. 7 is a schematic view of a resistive sensor node in accordance with an embodiment of the disclosure.

FIG. 5 is a schematic view of a capacitive sensor node 250, FIG. 6 is a schematic view of a voltage sensor node 260, and FIG. 7 is a schematic view of a resistive sensor node 270 as example embodiments of the sensor node 68b. Each of the sensor nodes 250, 260, 270 can include a mechanical resonator 240. The mechanical resonator 240 can be bulk acoustic wave devices with resonant frequencies in the GHz range, for example. The mechanical resonator 240 can act as a series connected resistor, inductor, and capacitor with a fixed resonating frequency.

For sensors responding to a sensed value as a change in capacitance, the capacitive sensor node 250 can be used. The capacitive sensor node 250 includes the mechanical resonator 240 in parallel with a capacitive sensor 252 having a variable capacitance as a sensed capacitance 254. The change in capacitance can result in a tone with a frequency shifted from resonance due to the sensor capacitance whereby sensor information is reflected back to the first antenna 206 based on the change in the detected resonating frequency from the expected resonating frequency.

For sensors responding to a sensed value as a change in voltage, the voltage sensor node 260 can be used. The voltage sensor node 260 can include the mechanical resonator 240 in parallel with a varactor diode 261 and a voltage sensor 262 having a variable voltage as a sensed voltage 264. The varactor diode 261 can convert a voltage change to a capacitance change. The change in capacitance can result in a tone with a frequency shifted from resonance due to the sensor capacitance whereby sensor information is reflected back to the first antenna 206 based on the change in the detected resonating frequency from the expected resonating frequency.

For sensors responding to a sensed value as a change in resistance, the resistive sensor node 270 can be used. The resistive sensor node 270 includes the mechanical resonator 240 in series with a resistive sensor 272 having a variable resistance as a sensed resistance 274. The change in resistance can result in a change in Q-factor of the resonant circuit. The change can be deduced from a parameter value such as the magnitude of a reflected wave. Thus, the resistive sensor node 270 can change a magnitude of a resonant frequency of the mechanical resonator 240 based on a sensed resistance 274 of the resistive sensor 272, which can be compared to an expected value to determine an equivalent sensed value.

Figure 8:
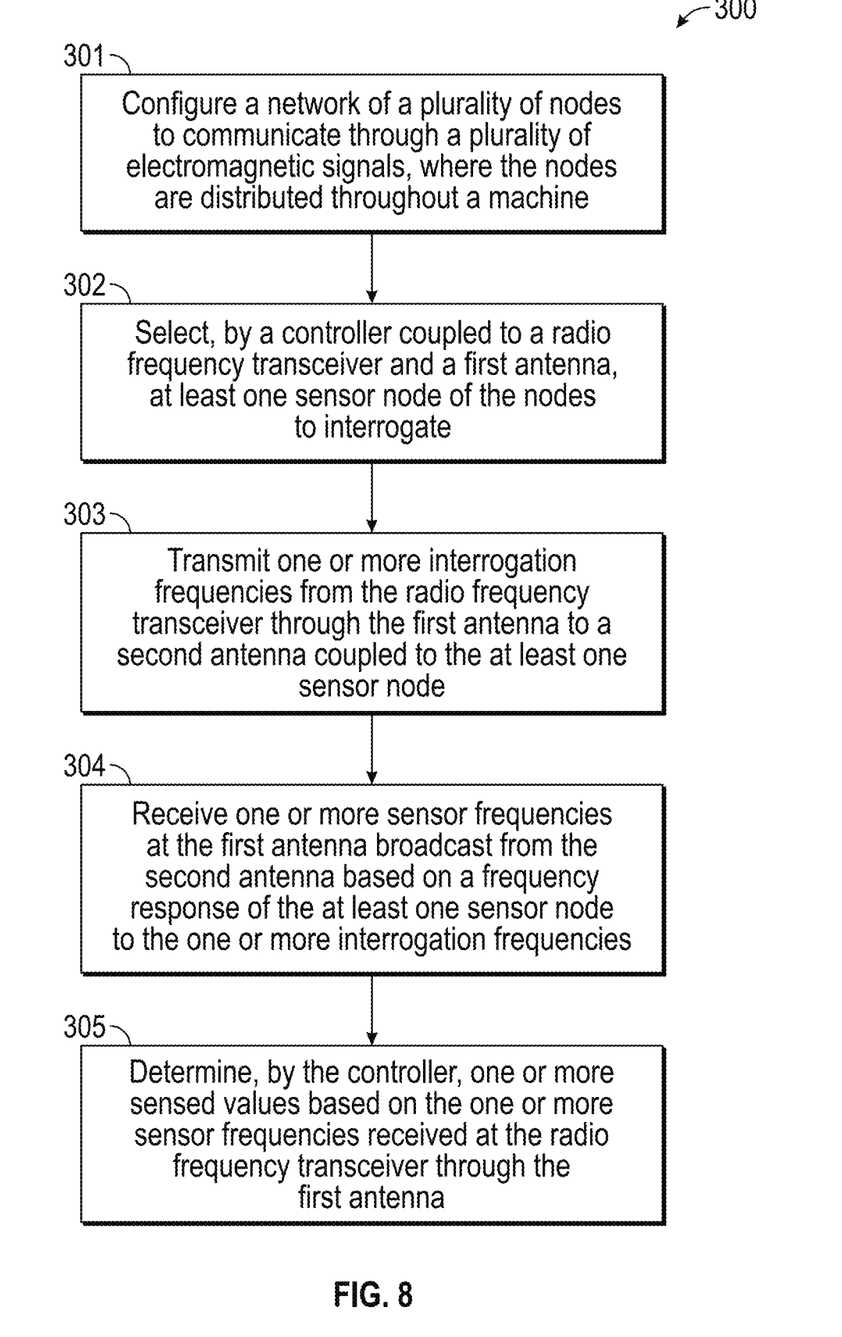
FIG. 8 is a flow chart illustrating a method in accordance with an embodiment of the disclosure.

FIG. 8 is a flow chart illustrating a method 300 of establishing electromagnetic communication through a machine, such as the gas turbine engine 20 of FIG. 1 in accordance with an embodiment. The method 300 of FIG. 6 is described in reference to FIGS. 1-7 and may be performed with an alternate order and include additional steps. For purposes of explanation, the method 300 is primarily described in reference to FIG. 1 but can also be implemented on the guided electromagnetic transmission network 100 of FIG. 2 and other network variations and a variety of machines. The machine may operate in or produce a high-temperature environment (e.g., >150 degrees C.) beyond the normal range of microelectronics, which is typically less than 100 degrees C. The local temperature at different sections of the machine can vary substantially, such as upstream from combustion, at a fuel combustion location, and downstream from combustion.

At block 301, a network 65 of a plurality of nodes 68a, 68b can be configured to communicate through a plurality of electromagnetic signals, where the nodes 68a, 68b are distributed throughout a machine, such as the gas turbine engine 20. Multiple nodes 68a, 68b can be used in a complete system 64 to take advantage of architecture scalability. Each of the nodes 68a, 68b can be associated with at least one effector 102 or senor 104 of the gas turbine engine 20. For example, one or more of the nodes 68a, 68b can be located at least one of a fan section 22, a compressor section 24, a combustor section 26, and/or a turbine section 28 of the gas turbine engine 20.

At block 302, a controller 66 coupled to a radio frequency transceiver 204 and a first antenna 206 can select at least one sensor node 68b of the nodes 68a, 68b to interrogate. Communication within the network 65 of nodes 68a, 68b can be performed through transmission of electromagnetic signals, such as electromagnetic signals 86. Specific tones can be used to target desired end-points in the network 65.

At block 303, one or more interrogation frequencies 212 can be transmitted from the radio frequency transceiver 204 through the first antenna 206 to a second antenna 208 coupled to the at least one sensor node 68b. Transmission of electromagnetic signals can be guided in a plurality of waveguides 70-73, 202 and/or an electromagnetically closed space 222 between the controller 66 and one or more of the nodes 68a, 68b. The waveguides 70-73, 202 can include a waveguide medium, such as a gas or dielectric. The waveguide medium can be a fluid used by the machine, such as fuel, oil or other fluid in the gas turbine engine 20. Alternatively, the waveguide medium can be an engineered material to support electromagnetic communication. Further, the waveguide medium can be air. Additionally, the first antenna 206 and the second antenna 208 can be in electromagnetically unconstrained free space, for example, in a low noise and/or low security risk environment.

The one or more sensor nodes 68b can each include a mechanical resonator 240 having a different resonant frequency and configured to respond to one of the one or more interrogation frequencies 212. When the sensor node 68b is embodied as a capacitive sensor node 250 including a capacitive sensor 252 coupled to a mechanical resonator 240, the capacitive sensor node 250 can shift a resonant frequency of the mechanical resonator 240 based on a sensed capacitance 254 of the capacitive sensor 252. When the sensor node 68b is embodied as a voltage sensor node 260 including a voltage sensor 262 coupled to a varactor diode 261 and mechanical resonator 240, the voltage sensor node 260 can shift a resonant frequency of the mechanical resonator 240 based on a sensed voltage 264 of the voltage sensor 262. When the sensor node 68b is embodied as a resistive sensor node 270 including a resistive sensor 272 coupled to a mechanical resonator 240, the resistive sensor node 270 can change a magnitude of a resonant frequency of the mechanical resonator 240 based on a sensed resistance 274 of the resistive sensor 272.

At block 304, the controller 66 can receive one or more sensor frequencies 214 at the first antenna 206 broadcast from the second antenna 208 based on a frequency response of the at least one sensor node 68b to the one or more interrogation frequencies 212.

At block 305, the controller 66 can determine one or more sensed values based on the one or more sensor frequencies 214 received at the radio frequency transceiver 204 through the first antenna 206. The technique used to determine one or more sensed values can vary depending upon the type of sensor and response characteristics as previously described with respect to FIGS. 5-7.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a machine, the system comprising:
a network of a plurality of nodes distributed throughout the machine, each of the nodes operable to communicate through a plurality of electromagnetic signals;
a radio frequency transceiver;
a first antenna coupled to the radio frequency transceiver;
a second antenna coupled to a first sensor node and a second sensor node of the plurality of nodes; and
a controller coupled to the radio frequency transceiver and configured to:
select at least one sensor node to interrogate;
transmit one or more interrogation frequencies from the radio frequency transceiver through the first antenna to the second antenna;
receive one or more sensor frequencies at the first antenna broadcast from the second antenna based on a frequency response of at least one of the first sensor node and the second sensor node to the one or more interrogation frequencies, wherein the first sensor node comprises one or more sensors with a first resonator and the second sensor node comprises one or more sensors with a second resonator, wherein at least one of the first sensor node and the second sensor node is configured to return two or more sensed values simultaneously, and wherein each of the one or more sensors of the first sensor node and each of the one or more sensors of the second sensor node are identified by a frequency closeness to a designated reference frequency, wherein each of the first resonator and the second resonator has a different resonant frequency and is configured to respond to one of the one or more interrogation frequencies, and a sensor of the one or more sensors of the first sensor node is coupled to the first resonator and comprises one of a capacitive sensor, a voltage sensor, or a resistive sensor; and determine one or more sensed values based on the one or more sensor frequencies received at the radio frequency transceiver through the first antenna, wherein at least one of the first resonator and the second resonator is a mechanical resonator having a fixed resonating frequency.

2. The system of claim 1, further comprising a waveguide coupled to the first antenna and the second antenna, wherein the waveguide is configured to guide electromagnetic signals transmitted between the first antenna and the second antenna.

3. The system of claim 1, wherein the first antenna and the second antenna are within an electromagnetically closed space.

4. The system of claim 1, wherein the capacitive sensor is configured to shift a first resonant frequency of the first resonator based on a sensed capacitance of the capacitive sensor.

5. The system of claim 1, wherein the voltage sensor is configured to shift a first resonant frequency of the first resonator based on a sensed voltage of the voltage sensor.

6. The system of claim 1, wherein the resistive sensor is configured to change a magnitude of the first resonant frequency of the first resonator based on a sensed resistance of the resistive sensor.

7. A system for a gas turbine engine, the system comprising:
a network of a plurality of nodes distributed throughout the gas turbine engine, each of the nodes associated with at least one sensor and/or effector of the gas turbine engine and operable to communicate through a plurality of electromagnetic signals;
a radio frequency transceiver;
a first antenna coupled to the radio frequency transceiver;
a second antenna coupled to a first sensor node and a second sensor node of the plurality of nodes; and
a controller coupled to the radio frequency transceiver and configured to:
select at least one sensor node to interrogate;
transmit one or more interrogation frequencies from the radio frequency transceiver through the first antenna to the second antenna;
receive one or more sensor frequencies at the first antenna broadcast from the second antenna based on a frequency response of at least one of the first sensor node and the second sensor node to the one or more interrogation frequencies, wherein the first sensor node comprises one or more sensors with a first resonator and the second sensor node comprises one or more sensors with a second resonator, wherein at least one of the first sensor node and the second sensor node is configured to return two or more sensed values simultaneously, and wherein each of the one or more sensors of the first sensor node and each of the one or more sensors of the second sensor node are identified by a frequency closeness to a designated reference frequency, wherein each of the first resonator and the second resonator has a different resonant frequency and is configured to respond to one of the one or more interrogation frequencies, and a sensor of the one or more sensors of the first sensor node is coupled to the first resonator and comprises one of a capacitive sensor, a voltage sensor, or a resistive sensor; and determine one or more sensed values based on the one or more sensor frequencies received at the radio frequency transceiver through the first antenna, wherein at least one of the first resonator and the second resonator is a mechanical resonator having a fixed resonating frequency.

8. The system of claim 7, wherein one or more nodes of the plurality of nodes are located at least one of a fan section, a compressor section, a combustor section and a turbine section of the gas turbine engine.

9. The system of claim 7, wherein the capacitive sensor is configured to shift a first resonant frequency of the first resonator based on a sensed capacitance of the capacitive sensor.

10. The system of claim 7, wherein the voltage sensor is configured to shift a first resonant frequency of the first resonator based on a sensed voltage of the voltage sensor.

11. The system of claim 7, wherein the resistive sensor is configured to change a magnitude of the first resonant frequency of the first resonator based on a sensed resistance of the resistive sensor.

12. A method of establishing electromagnetic communication through a machine, the method comprising:
configuring a network of a plurality of nodes to communicate through a plurality of electromagnetic signals, wherein the nodes are distributed throughout the machine;
selecting, by a controller coupled to a radio frequency transceiver and a first antenna, at least one sensor node of the nodes to interrogate;
transmitting one or more interrogation frequencies from the radio frequency transceiver through the first antenna to a second antenna coupled to a first sensor node and a second sensor node of the nodes;
receiving one or more sensor frequencies at the first antenna broadcast from the second antenna based on a frequency response of at least one of the first sensor node and the second sensor node to the one or more interrogation frequencies, wherein the first sensor node comprises one or more sensors with a first resonator and the second sensor node comprises one or more sensors with a second resonator, wherein at least one of the first sensor node and the second sensor node is configured to return two or more sensed values simultaneously, and wherein each of the one or more sensors of the first sensor node and each of the one or more sensors of the second sensor node are identified by a frequency closeness to a designated reference frequency, wherein each of the first resonator and the second resonator has a different resonant frequency and is configured to respond to one of the one or more interrogation frequencies, and a sensor of the one or more sensors of the first sensor node is coupled to the first resonator and comprises one of a capacitive sensor, a voltage sensor, or a resistive sensor; and
determining, by the controller, one or more sensed values based on the one or more sensor frequencies received at the radio frequency transceiver through the first antenna, wherein at least one of the first resonator and the second resonator is a mechanical resonator having a fixed resonating frequency.

13. The method of claim 12, further comprising guiding electromagnetic signals transmitted between the first antenna and the second antenna in a waveguide.

14. The method of claim 12, further comprising confining electromagnetic signals transmitted between the first antenna and the second antenna within an electromagnetically closed space.

15. The method of claim 12, further comprising:
shifting a first resonant frequency of the first resonator based on a sensed capacitance of the capacitive sensor.

16. The method of claim 12, further comprising:
shifting a first resonant frequency of the first resonator based on a sensed voltage of the voltage sensor.

17. The method of claim 12, further comprising:
changing a magnitude of a first resonant frequency of the first resonator based on a sensed resistance of the resistive sensor.

* * * * *